United States Patent
Angermayer

(10) Patent No.: US 10,248,287 B2
(45) Date of Patent: Apr. 2, 2019

(54) ENABLE DEPENDENCY ON PICKER WHEELS FOR TOUCH-ENABLED DEVICES BY INTERPRETING A SECOND FINGER TOUCH GESTURE

(71) Applicant: Thomas Angermayer, Stetten (DE)

(72) Inventor: Thomas Angermayer, Stetten (DE)

(73) Assignee: SuccessFactors, Inc., South San Francisco, CA (US)

( * ) Notice: Subject to any disclaimer, the term of this patent is extended or adjusted under 35 U.S.C. 154(b) by 539 days.

(21) Appl. No.: 14/572,357

(22) Filed: Dec. 16, 2014

(65) Prior Publication Data

US 2016/0170578 A1   Jun. 16, 2016

(51) Int. Cl.
| | |
|---|---|
| *G06F 3/0482* | (2013.01) |
| *G06F 3/0488* | (2013.01) |
| *G06F 3/0485* | (2013.01) |
| *G06F 3/0484* | (2013.01) |

(52) U.S. Cl.
CPC .......... *G06F 3/0482* (2013.01); *G06F 3/0485* (2013.01); *G06F 3/0488* (2013.01); *G06F 3/04847* (2013.01); *G06F 3/04886* (2013.01)

(58) Field of Classification Search
CPC .............. G06F 3/0482; G06F 3/04847; G06F 2200/1637; G06F 3/0416; G06F 3/0485; G06F 3/04886; G06F 3/017; G06F 3/048; G06F 3/04883
USPC ....................................................... 715/830
See application file for complete search history.

(56) References Cited

U.S. PATENT DOCUMENTS

| | | | | |
|---|---|---|---|---|
| 5,491,782 | A * | 2/1996 | King ................... | G06F 3/04847 715/833 |
| 2006/0227122 | A1* | 10/2006 | Proctor ................ | G09G 3/20 345/204 |
| 2008/0165141 | A1* | 7/2008 | Christie ................ | G06F 3/044 345/173 |
| 2011/0080351 | A1* | 4/2011 | Wikkerink .......... | G06F 3/04883 345/173 |
| 2013/0145327 | A1* | 6/2013 | Rinearson ............ | G06F 3/017 715/863 |
| 2014/0297674 | A1* | 10/2014 | Rhee .................... | G06F 3/167 707/758 |

(Continued)

*Primary Examiner* — Jennifer N To
*Assistant Examiner* — Terri L Filosi
(74) *Attorney, Agent, or Firm* — Mintz Levin Cohn Ferris Glovsky and Popeo, P.C.

(57) ABSTRACT

Methods and apparatus, including computer program products, are provided for finger gestures. In one aspect there is provided a method, which may include detecting a first finger gesture proximate to or making contact with a graphical user interface element representative of a first picker wheel presented on a user interface; detecting a second finger gesture proximate to or making contact with the user interface, the second finger gesture detected during a time period comprising a time when the first finger gesture is proximate to or making contact with the first picker wheel; changing, when the second finger gesture is detected, a second picker wheel from an independent mode to a dependent mode; and updating, when in the dependent mode, the second picker wheel based on a selection value made via the first finger gesture at the first picker wheel. Related systems, methods, and articles of manufacture are also described.

18 Claims, 4 Drawing Sheets

(56) References Cited

U.S. PATENT DOCUMENTS

2014/0298237 A1* 10/2014 Galu, Jr. ............. G06F 3/04883
715/773

* cited by examiner

ENABLE DEPENDENCY ON PICKER WHEELS FOR TOUCH-ENABLED DEVICES BY INTERPRETING A SECOND FINGER TOUCH GESTURE

FIELD

The present disclosure generally relates to finger gestures on touch sensitive displays.

BACKGROUND

Touch-based devices have become increasingly important for computer-based devices. For example, smart phones, tablets, and other devices include touch sensitive user interfaces to allow a user to make selections. Although touch-based devices may allow a user to touch a user interface to interact with the device, gestures used to interact with the device may not be intuitive or may be difficult for some users to gesture, making it difficult for the users to interact with the device via touch.

SUMMARY

Methods and apparatus, including computer program products, are provided for finger gestures.

In one aspect there is provided a method, which may include detecting a first finger gesture proximate to or making contact with a graphical user interface element representative of a first picker wheel presented on a user interface; detecting a second finger gesture proximate to or making contact with the user interface, the second finger gesture detected during a time period comprising a time when the first finger gesture is proximate to or making contact with the first picker wheel; changing, when the second finger gesture is detected, a second picker wheel from an independent mode to a dependent mode; and updating, when in the dependent mode, the second picker wheel based on a selection value made via the first finger gesture at the first picker wheel. Related systems, methods, and articles of manufacture are also described.

In some implementations, the above-noted aspects may further include additional features described herein including one or more of the following. The first picker wheel may represent a first rotatable wheel including one or more first items. The first picker wheel may be displayed to enable selection of the one or more first items via the first finger gesture. The one or more items may represent one or more days of the month. The second picker wheel may represent a second rotatable wheel including one or more second items. The second picker wheel may be displayed to enable selection of the one or more second items via the second finger gesture. The one or more items may represent one or more months of the year. The independent mode may configure the first picker wheel and the second picker wheels to operate independent, and the dependent mode may causes a selection at the first picker wheel to affect the second picker. The second picker wheel may be changed to an independent mode. The changing to the independent mode may be triggered by at least one of a time out period, a second touch of the second finger gesture, or non-contact by the first finger gesture.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1A:
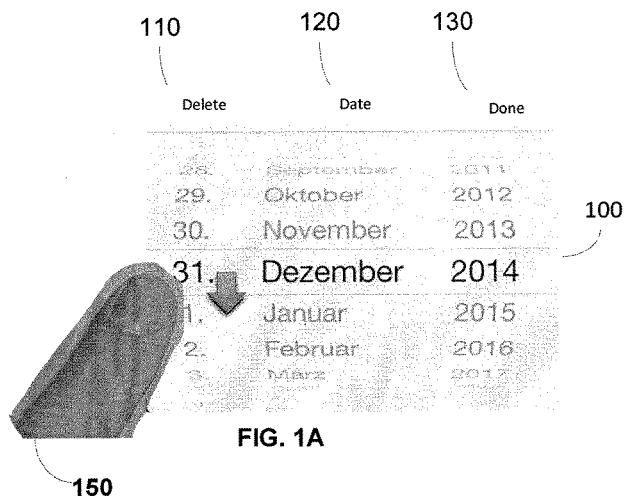
FIGS. 1A-1D depict examples of graphical user interfaces including 3 picker wheels in independent mode.
Figure 1B:
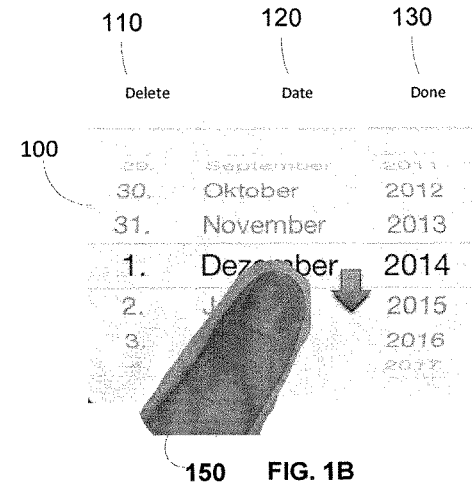
Figure 1C:
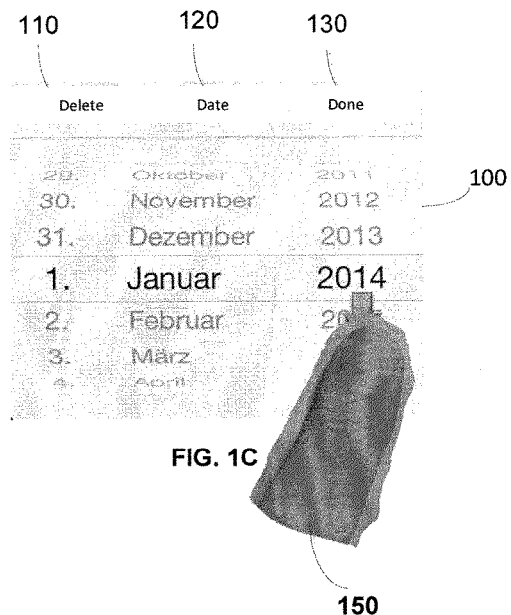

Like labels are used to refer to same or similar items in the drawings.

DETAILED DESCRIPTION

A selection wheel (also referred as a so-called "picker wheel") is a graphical user interface element representative of a rotatable, spinning wheel including items which can be selected by rotating, via a touch gesture on a touch screen, the wheel.

Figure 1D:
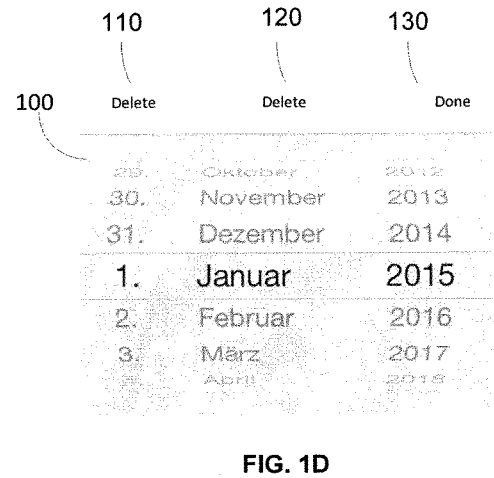

FIGS. 1A-1D depict an example of a graphic user interface 100 including 3 graphical user interface elements representative of picker wheels 110, 120, and 130. At FIG. 1A, the first picker wheel 110 corresponds to a day selection, so a single finger gesture 150, such as a downward swipe or an upward swipe, can be used to rotate/spin or otherwise move the picker wheel until the desired date is selected (which in this example is moving the date from the 31st to the 1st). At FIG. 1B, the finger gesture 150 rotates the second picker wheel 120 to independently select a month (which in this example moves the month from December to January). Then, the finger gesture 150 at FIG. 1C moves to the third picker wheel 130 to independently select a year (which in this case moves the year from 2014 to 2015). FIG. 1D depicts the resulting settings for the picker wheels 110-130.

Although FIG. 1 depicts a downward arrow, the wheels may be moved up or down.

The example of FIGS. 1A-D show that the picker wheels are completely independent, so that although a date increment of only one day is required from Dec. 31, 2014 to Jan. 1, 2015, three independent wheel selections are needed in this example.

The subject matter described herein relates to configuring the graphical user interface elements so that a detection of a second finger gesture changes the picker wheels from an independent wheel mode (in which each wheel operates without regard to the others as described above with respect to FIGS. 1A-D) to a dependent wheel mode (in which a change at a given wheel affects another wheel).

Figure 2A:
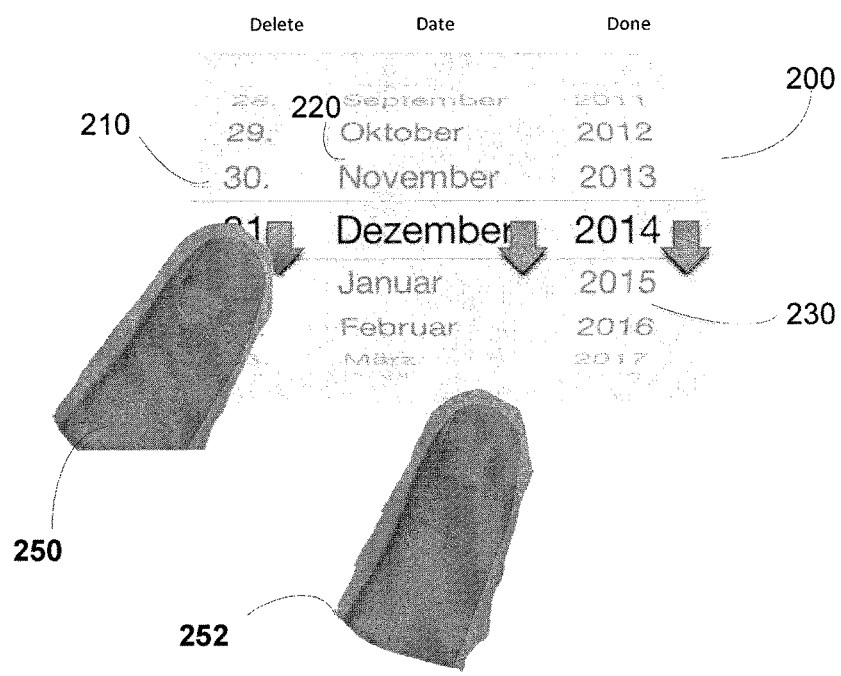
FIGS. 2A-2B depict examples of graphical user interfaces including 3 picker wheels in dependent mode.

FIG. 2A depicts an example of a graphical user interface 200 including three picker wheels 210, 220, and 230 corresponding to date, month, and year picker wheels.

In the example of FIG. 2A, a first finger gesture 250 may select one of the picker wheels, such as picker wheel 210 to move the date from "31" to "1." While the first finger gesture is making contact with the date picker wheel 210, a second finger gesture 252 makes contact with a portion of user interface 200. When this is the case, the picker wheels 210-230 change modes from an independent mode to a dependent mode.

Figure 2B:
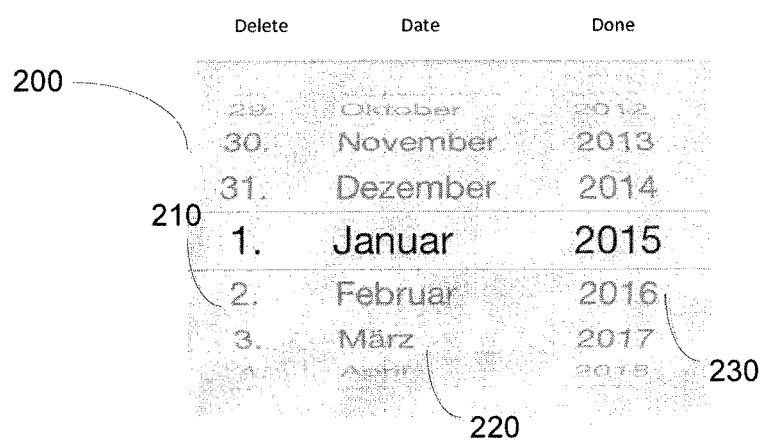

While in dependent mode, a selection at the date picker wheel 210 may have an impact on the month picker wheel 220 and/or the year picker wheel 230. In this example, moving the date at the date picker wheel from the 31st to the 1st causes the month wheel 220 to scroll to January, which in turn causes the year picker wheel 230 to scroll to 2015 as shown in FIG. 2B. And, if the picker wheel is moved back to the 31st, the second picker wheel would move back to December due to the dependent mode operation of the picker wheels.

In some implementations, the dependent mode remains active so long as the first finger gesture 250 makes contact with the user interface/touch screen presenting the graphical user interface 200 and the second finger gesture 252 makes contact with a portion of the touch screen presenting the graphical user interface 200. When this is the case, the first finger gesture 250 and/or the second finger gesture 252 not making contact returns the picker wheels to the independent mode.

In some implementations, the dependent mode is activated by a first touch (for example, a tap) of the second finger 252 while the first finger gesture 250 is making contact with a portion of the touch screen presenting the graphical user interface 200. When this is the case, a second touch by the second finger gesture 252 while the first finger gesture 250 is making contact with the touch screen may return the picker wheels to an independent mode.

In some implementations, the dependent mode is activated so long as the second finger gesture 252 makes contact with a specific portion of the user interface 200 while the first finger gesture 250 is also making contact with a touch screen presenting the graphical user interface 200. For example, the second finger gesture 252 may be required to touch the second picker wheel 220 and/or the third picker wheel 230 (or a designated portion) to change mode into a dependent mode.

In some implementations, the dependent mode may remain active for a given time period (for example, 5 seconds, 10 seconds, 20 seconds, 30 seconds, 1 minute, 2 minutes, and/or other times as well) after the single tap of the second finger gesture 252, after which the mode returns to independent mode.

In some implementations, detecting that the second finger gesture 252 makes contact with the second picker wheel 220 (while the first finger gesture 250 is making contact with a portion associated with the first picker wheel 210) makes the picker wheels 210 and 220 dependent but not the third picker wheel 230 unless the second finger gesture 252 also touches for example the third picker wheel 230.

Although the previous examples refers to specific types of picker wheels (for example, date, month, and year selection), other types of data may be selected via picker wheels as well. The picker wheels may also be used to dependently pick for example hours, minutes, and seconds (for example, "9"-"30"-"PM"), data and time (for example, "2014-11-11"-"9"-"30"-"PM"), and/or prices (for example, "3 Euro"-"50 cent").

Furthermore, although the examples refer to touching a portion of the graphical user interface, touch may refer to touching a touch sensitive display or interface. Moreover, the touch may comprise a proximate touch as some touch sensitive displays can detect a figure touch without actual contact (for example, some capacitive touch displays do not require actual contact with the touch display) on the display.

Figure 3:
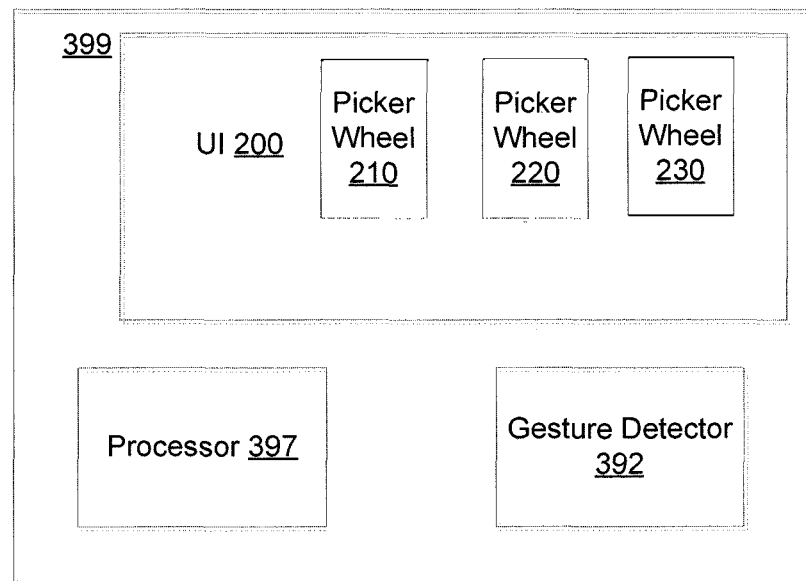
FIG. 3 depicts an example of a system for changing picker wheels from independent mode to dependent mode based on a detection of a second finger gesture.

FIG. 3 depicts a system 399 for detecting second finger gestures 252 that trigger a change in mode of picker wheels from independent to dependent (and/or vice versa), in accordance with some example implementations. The description of FIG. 3 also refers to FIGS. 2A-2B.

System 300 may include graphical user interface 200, a processor 397, and a gesture detector 392.

The graphical user interface 300 may include one or more graphical user interface elements, such as picker wheels 210-230. The graphical user interface may be implemented via a display including one or more touch sensitive regions where finger gestures 250 and 252 can be detected. For example, an application, such as a browser and the like, may generate a page, such as HTML, including the picker wheels 210-230, so that the picker wheels can be rotated, selected, and the like via touch (for example, an upward or downward movement or swipe) on the touch sensitive display.

The processor 397 may include at least one processor circuitry and at least one memory circuitry including computer code, which when executed may provide one or more of the operations disclosed herein. Gesture detector 392 may be implemented using processor 397, although gesture detector 392 may be implemented using dedicated processor circuitry and/or portions of gesture detector 392 may be incorporated into user interface 200 and/or a touch sensitive display (as well as corresponding touch sensitive display circuitry).

Figure 4:
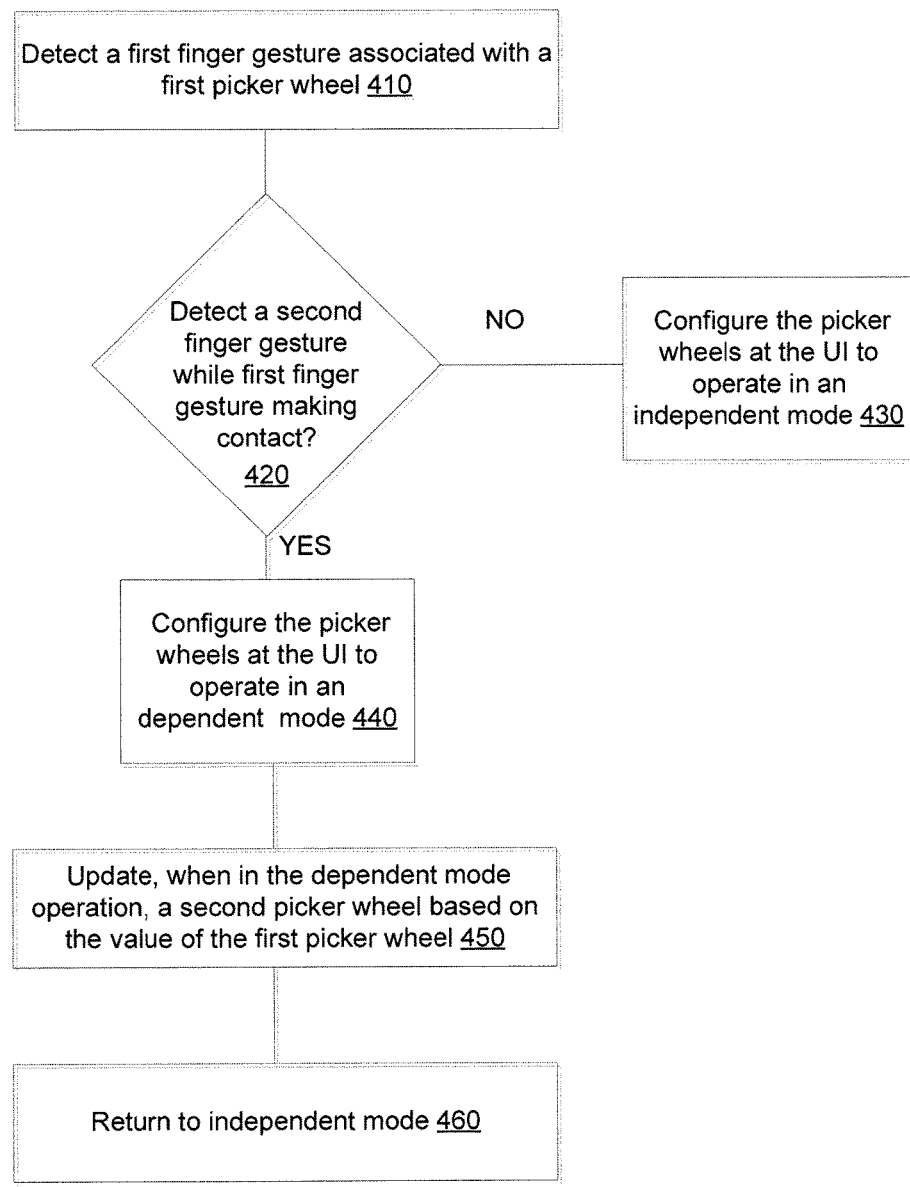
FIG. 4 depicts an example of a process for changing picker wheels from independent mode to dependent mode based on a detection of a second finger gesture.

FIG. 4 depicts a process 400 for detecting a two finger gesture that changes the state of picker wheels from independent to dependent (and/or vice versa), in accordance with some example implementations. The description of FIG. 4 also refers to FIGS. 2A-B and 3.

At 410, a first finger gesture associated with a first picker wheel may be detected. For example, when finger gesture 250 touches (or is proximate to) a touch sensitive display presenting picker wheel 210, gesture detector 392 may detect this touch event by first finger gesture 250 with respect to picker wheel 210.

At 420, a second finger gesture may be detected while the first finger gesture is making contact with a portion of the graphical user interface. For example, gesture detector 392 may detect second finger gesture 252 while the first finger gesture 250 is making contact with a portion of the graphical user interface. When this is the case, gesture detector 392 may indicate a change in operating mode to a dependent mode (yes at 420). In some example implementations, the gesture detector is configured to allow the first finger gesture 250 to momentarily (for example, 2, seconds, 3, seconds, 5 seconds, 10 seconds, 30 seconds, and/or other times as well) not make contact with the touch screen but still register a detection of the second finger gesture 252.

If the gesture detector 392 does not detect second finger gesture 252 while the first finger gesture 250 is making contact with a portion of the graphical user interface, the gesture detector 392 may stay in the independent mode (no at 420). For example, while the first finger gesture 250 is making contact with the picker wheel 210, gesture detector 292 may detect second finger gesture 252 making contact with a portion of the touch screen, such as one of the other picker wheels and/or another predetermined portion of the touch screen presenting graphical user interface 200. As noted above, the gesture detector may, in some implementations, only recognize the second finger gesture 252 when the first finger gesture 250 is actually moving or making contact with the picker wheel 210.

At 430, the picker wheels may operate in independent mode. If the second finger gesture 252 is not detected by for example the gesture detector, the picker wheels may operate independently as noted above with respect to FIG. 1A-1D, so that a change at a given picker wheel does not affect another picker wheel.

At 440, the picker wheel may be configured to operate in a dependent mode. If the second finger gesture is detected by for example the gesture detector, the picker wheels may operate in the dependent mode, so that a change at a given picker wheel does affect another picker wheel as noted for example with respect to FIGS. 2A-2B. Additionally or alternatively, gesture detector may stay in the dependent mode so long as the first finger gesture 250 is making contact with the user interface/touch screen and the second finger gesture 252 makes contact with the user interface/touch screen as well. In this example, when the first finger gesture 250 and/or the second finger gesture 252 do not make contact with the user interface and/or touch screen, the gesture detector changes picker wheel mode to independent mode.

When in dependent mode, operation of a second picker wheel may be updated, at 450, based on the value of the first picker wheel. For example, when the first picker wheel moves via the first finger gesture 250 from the $31^{st}$ to the "$1^{st}$", the processor and/or gesture detector may update the picker wheels 220 and 230 to dependently move to January and 2015 as described above with respect to FIG. 2A-2B.

At 460, the mode may return to independent mode. The gesture detector and/or processor may trigger a reversion to the independent mode. This reversion may occur after a predetermined timeout period. Alternatively or additionally, a second touch by the second finger gesture 252 may trigger the reversion to the independent mode. Alternatively or additionally, ceasing the touching by the first finger gesture 250 and/or the second finger gesture may trigger the reversion to the independent mode. Alternatively or additionally, the dependent mode may revert to independent mode when a second touch by the second finger gesture 252 is detected while the first finger gesture 250 is making contact with the touch screen. Alternatively or additionally, the dependent mode may remain active for a given time period (for example, 10 seconds, 20 seconds, 1 minute, 2 minutes, and/or other times as well) after a single tap of the second finger gesture 252, after which the mode returns to independent mode.

Although the previous example describes a specific use case, other uses cases may be implemented as well.

Furthermore, although the previous example described the second finger gesture 252 as a touch or tap of the user interface, other gestures may be used as well. For example, other gestures, such as a pinch as well as any other gesture with the second finger may be used as well. Moreover, the touches may be proximate, as noted, to the user interface (so actual contact may not occur).

Without in any way limiting the scope, interpretation, or application of the claims appearing below, a technical effect of one or more of the example embodiments disclosed herein is enhanced control of picker wheels presented on a device, such as handheld devices including cell phones, tablets, smart phones, and/or laptops/computers having touch sensitive displays.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:
1. A system comprising:
   at least one processor; and
   at least one memory including computer program code which when executed by at least one processor causes operations comprising:
      detecting a first finger gesture proximate to or making contact with a graphical user interface element including a first picker wheel presented on a user interface;
      detecting a second finger gesture proximate to or making contact with the user interface, the second finger gesture is located on the user interface and outside of the graphical user interface element and is detected during a time period comprising a time when the first finger gesture is proximate to or making contact with the first picker wheel;
      changing, in response to detecting the second finger gesture, a second picker wheel from an independent mode to a dependent mode, wherein when in the independent mode, the second picker wheel is editable without regard to the first picker wheel, wherein when in the dependent mode, the second picker wheel is editable and a change in the first picker wheel affects the second picker wheel;

updating, when in the dependent mode, the second picker wheel based on a selection value made via the first finger gesture at the first picker wheel; and changing the second picker wheel to the independent mode, wherein the changing to the independent mode is triggered by a time out period.

2. The system of claim 1, wherein the first picker wheel represents a first rotatable wheel including one or more first items, the first picker wheel displayed to enable selection of the one or more first items via the first finger gesture.

3. The system of claim 2, wherein the one or more first items represent one or more days of the month.

4. The system of claim 1, wherein the second picker wheel represents a second rotatable wheel including one or more second items, the second picker wheel displayed to enable selection of the one or more second items via the second finger gesture.

5. The system of claim 4, wherein the one or more second items represent one or more months of the year.

6. The system of claim 1, wherein the second picker wheel operates in the dependent mode so long as the first finger gesture and the second figure gesture are detected proximate to or making contact with the user interface.

7. The system of claim 1, wherein the changing to the independent mode is further triggered by at least one of a second touch of the second finger gesture and a non-contact by the first finger gesture.

8. A method comprising:
 detecting a first finger gesture proximate to or making contact with a graphical user interface element including a first picker wheel presented on a user interface;
 detecting a second finger gesture proximate to or making contact with the user interface, the second finger gesture is located on the user interface and outside of the graphical user interface element and is detected during a time period comprising a time when the first finger gesture is proximate to or making contact with the first picker wheel;
 changing, in response to detecting the second finger gesture, a second picker wheel from an independent mode to a dependent mode, wherein when in the independent mode, the second picker wheel is editable without regard to the first picker wheel, wherein when in the dependent mode, the second picker wheel is editable and a change in the first picker wheel affects the second picker wheel;
 updating, when in the dependent mode, the second picker wheel based on a selection value made via the first finger gesture at the first picker wheel; and
 changing the second picker wheel to the independent mode, wherein the changing to the independent mode is triggered by a time out period.

9. The method of claim 8, wherein the first picker wheel represents a first rotatable wheel including one or more first items, the first picker wheel displayed to enable selection of the one or more first items via the first finger gesture.

10. The method of claim 9, wherein the one or more first items represent one or more days of the month.

11. The method of claim 8, wherein the second picker wheel represents a second rotatable wheel including one or more second items, the second picker wheel displayed to enable selection of the one or more second items via the second finger gesture.

12. The method of claim 11, wherein the one or more second items represent one or more months of the year.

13. The method of claim 12, wherein the second picker wheel operates in the dependent mode so long as the first finger gesture and the second figure gesture are detected proximate to or making contact with the user interface.

14. The method of claim 8, wherein the changing to the independent mode is further triggered by at least one of a second touch of the second finger gesture and a non-contact by the first finger gesture.

15. A non-transitory computer-readable storage medium including computer program code which when executed by at least one processor causes operations comprising:
 detecting a first finger gesture proximate to or making contact with a graphical user interface element including a first picker wheel presented on a user interface;
 detecting a second finger gesture proximate to or making contact with the user interface, the second finger gesture is located on the user interface and outside of the graphical user interface element and is detected during a time period comprising a time when the first finger gesture is proximate to or making contact with the first picker wheel;
 changing, in response to detecting the second finger gesture, a second picker wheel from an independent mode to a dependent mode, wherein when in the independent mode, the second picker wheel is editable without regard to the first picker wheel, wherein when in the dependent mode, the second picker wheel is editable and a change in the first picker wheel affects the second picker wheel;
 updating, when in the dependent mode, the second picker wheel based on a selection value made via the first finger gesture at the first picker wheel; and
 changing the second picker wheel to the independent mode, wherein the changing to the independent mode is triggered by a time out period.

16. The non-transitory computer-readable storage medium of claim 15, wherein the first picker wheel represents a first rotatable wheel including one or more first items, the first picker wheel displayed to enable selection of the one or more first items via the first finger gesture.

17. The non-transitory computer-readable storage medium of claim 15, wherein the one or more first items represent one or more days of the month.

18. The non-transitory computer-readable storage medium of claim 15, wherein the second picker wheel represents a second rotatable wheel including one or more second items, the second picker wheel displayed to enable selection of the one or more second items via the second finger gesture.

* * * * *